G. D. THOMAS.
VALVE.
APPLICATION FILED NOV. 15, 1915.

1,201,990.

Patented Oct. 17, 1916.

WITNESSES:

INVENTOR
GUYER D. THOMAS,
BY Munn & Co
ATTORNEYS

UNITED STATES PATENT OFFICE.

GUYER DRUMMOND THOMAS, OF NORTH YAKIMA, WASHINGTON.

VALVE.

1,201,990.

Specification of Letters Patent.

Patented Oct. 17, 1916.

Application filed November 15, 1915. Serial No. 61,624.

*To all whom it may concern:*

Be it known that I, GUYER D. THOMAS, a citizen of the United States, and a resident of North Yakima, in the county of Yakima and State of Washington, have invented certain new and useful Improvements in Valves, of which the following is a specification.

My invention is an improvement in valves, and the invention has for its object to provide a valve especially designed for controlling the flow of water from pipes used in irrigation or for like purposes, wherein an internally threaded casing is provided adapted for connection with the end of the pipe and having a lateral orifice gradually increasing in width from within outward, and a controlling valve in the form of a hollow plug or cap threaded into the outer end of the casing.

Figure 1:
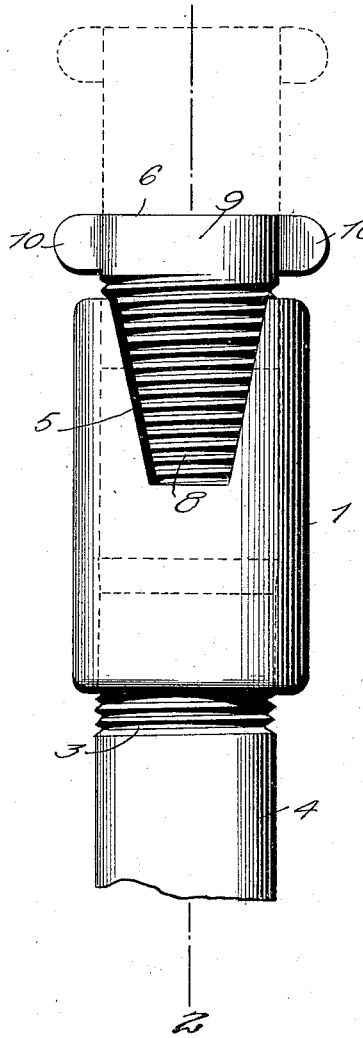

In the drawings: Figure 1 is a side view of the valve, and Fig. 2 is a section on the line 2—2 of Fig. 1.

In the present embodiment of the invention, a casing is provided in the form of a sleeve 1, of suitable length and cross sectional area, the said sleeve being internally threaded as indicated at 2, throughout its length. One end of the sleeve is adapted to be threaded onto the threaded end 3 of the irrigating pipe 4, and the other end of the sleeve is provided with a discharge opening 5. This opening is of a length approximately half the length of the sleeve, and the opening is of greatest width at the end of the casing remote from the pipe 4, and gradually decreases in width toward its inner end.

The valve is in the form of a cap or hollow plug comprising an end 6, and a lateral marginal annular flange 7, or the valve may be considered as consisting of a cylindrical body 7, having its outer end closed, as at 6. The valve is externally threaded as shown at 8, over the greater portion of its length, from the open end toward the closed end, there being a plain portion 9 left at the closed end, and the plug is provided with outwardly extending radial lugs or ears 10, for convenience in rotating the valve.

Figure 2:
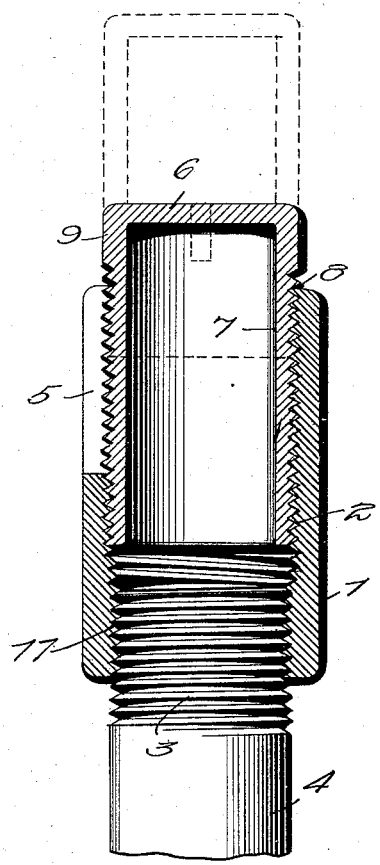

In operation, the valve normally occupies the full line position of Figs. 1 and 2, that is, is threaded into the sleeve 1 far enough to entirely close the opening 5. When it is desired to open the valve, it is turned outward by means of the lugs 10, as indicated in dotted lines in Figs. 1 and 2, until the inner end of the opening 5 is exposed. As soon as this inner end is exposed, the water will commence to flow, and it will gradually increase its flow until the opening 5 is entirely uncovered. The opening 5 has an area corresponding closely to the area of the cross section of the pipe 4, and it will be evident that when the opening is open to its full extent, the capacity of the pipe 4 will be approximately equal to that of the opening 5, or to that portion which is uncovered. An air cushion is formed in the closed end of the valve, and there is a steady discharge to the full capacity of the pipe 4. The valve cannot clog with leaves or the like, and there are no gaskets, packing rings or the like.

It will be noticed from an inspection of Fig. 2 of the drawing that the internally threaded portion of the valve casing 1 is not alike throughout the extent of the casing. From the upper end of the casing to a point half way between the inner end of the outlet opening 5 and the opposite end of the casing, the threading is parallel, while that portion 11 at the end of the casing 1 adjacent to the pipe 4 is a taper thread. The difference between the parallel thread and the taper thread is so small that it is hardly noticeable at their point of intersection. When the valve 6—7 is turned down to the point where the taper thread commences, it tightens and causes a side thrust against the outer member or casing 1, thus making a water proof joint when it is desired that the water be turned off. This arrangement dispenses with the necessity for gaskets, packing rings, or washers. The thread 8 of the valve is all parallel. It will be understood also that while the form of opening shown at 5 is preferred, it is obvious that the opening might be circular, or of the same width throughout.

I claim:

In combination, a valve casing consisting of an internally threaded sleeve having at one end a lateral opening of greatest width at the outer end of the sleeve and gradually decreasing in width toward the inner end of the opening, and a valve comprising a hollow cylindrical body threaded into the casing at the end adjacent to the opening and having its outer end closed and provided with means for permitting the valve to be turned in the sleeve.

GUYER DRUMMOND THOMAS.

Witnesses:
S. H. MASON,
D. J. COY.

Copies of this patent may be obtained for five cents each, by addressing the "Commissioner of Patents, Washington, D. C."